(12) United States Patent
Chang et al.

(10) Patent No.: US 8,109,541 B2
(45) Date of Patent: Feb. 7, 2012

(54) LATCHING STRUCTURE OF MOBILE ELECTRONIC DEVICE

(75) Inventors: Yiming Chang, Taipei (TW); Yung Chih Kuo, Taipei (TW); Li Che Lu, Taipei (TW); Min-Chun Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 353 days.

(21) Appl. No.: 12/431,974

(22) Filed: Apr. 29, 2009

(65) Prior Publication Data

US 2010/0084874 A1 Apr. 8, 2010

(30) Foreign Application Priority Data

Oct. 8, 2008 (TW) .............................. 97138748 A

(51) Int. Cl.
 E05C 19/10 (2006.01)
 E05C 9/00 (2006.01)

(52) U.S. Cl. .............. 292/95; 292/44; 292/49; 292/101; 292/121; 292/125; 292/219; 292/224; 292/DIG. 37; 361/679.58

(58) Field of Classification Search ..................... 292/44, 292/45, 49, 53, 202, 219, 224, 54, 95, 96, 292/101, 116, 121, 125, 128, 194, 225, 228, 292/DIG. 37; 361/678.58
See application file for complete search history.

(56) References Cited

U.S. PATENT DOCUMENTS

| | | | | |
|---|---|---|---|---|
| 197,115 A * | 11/1877 | Frees | ............................... | 292/28 |
| 357,985 A * | 2/1887 | Frisbie | ............................ | 292/33 |
| 1,174,652 A * | 3/1916 | Banks | ............................... | 292/36 |
| 2,905,493 A * | 9/1959 | Tocchetto | ........................ | 292/37 |
| 3,596,952 A * | 8/1971 | Hinkle et al. | .................... | 292/27 |
| 4,547,006 A * | 10/1985 | Castanier | ......................... | 292/37 |
| 7,420,799 B2 * | 9/2008 | Wang | ........................ | 361/679.27 |
| 7,480,132 B2 * | 1/2009 | Wu et al. | .................. | 361/679.27 |
| 7,604,264 B2 * | 10/2009 | Lin et al. | ............................ | 292/1 |
| 7,609,514 B2 * | 10/2009 | Doczy et al. | .............. | 361/679.58 |
| 7,637,540 B2 * | 12/2009 | Chiang | ............................ | 292/45 |
| 7,656,663 B2 * | 2/2010 | Zhao et al. | ............... | 361/679.58 |
| 7,665,774 B2 * | 2/2010 | Kumagai et al. | .............. | 292/121 |
| 7,813,125 B2 * | 10/2010 | Huang | ...................... | 361/679.58 |
| 2006/0133019 A1 * | 6/2006 | Yamazaki et al. | ............. | 361/683 |
| 2009/0167061 A1 * | 7/2009 | Lee | ........................... | 296/203.01 |

FOREIGN PATENT DOCUMENTS

CN 101470463 7/2009

OTHER PUBLICATIONS

English translation of abstract of CN 101470463, (Jul. 1, 2009).

* cited by examiner

*Primary Examiner* — Carlos Lugo
(74) *Attorney, Agent, or Firm* — Thomas, Kayden, Horstemeyer & Risley, LLP

(57) ABSTRACT

A latching structure of a mobile electronic device includes a button module, at least one lock pin, at least one linking rod, and at least one hook module respectively disposed in a base and a display of the mobile electronic device. One end of the linking rod is coupled to the button module and another end of the linking rod is coupled to the hook module. When the button module is pressed, the button module drives the linking rod to force the hook module to release the lock pin so as to allow the user opening the display from the base of the mobile electronic device.

14 Claims, 3 Drawing Sheets

LATCHING STRUCTURE OF MOBILE ELECTRONIC DEVICE

RELATED APPLICATIONS

This application claims priority to Taiwan Application Serial Number 97138748, filed Oct. 8, 2008, which is herein incorporated by reference.

FIELD OF THE INVENTION

The present invention generally relates to a latching structure. More particularly, this invention relates to a latching structure of a mobile electronic device.

BACKGROUND OF THE INVENTION

With the improvements in electronic science and technology, mobile electronic devices, such as notebook computers, are becoming increasingly sophisticated. Notebooks are convenient, portable, lightweight devices capable of processing a large number of digital data and are popular to the general public.

Since notebook computers are portable and powerful computation devices, notebook computers have become a necessity for most businessmen. In addition, to conveniently carry the notebook computers, some notebook computers use latching structures to lock the displays on the bases thereof. The conventional latching structure has to occupy quite a large volume inside the mobile electronic device. Nowadays, the quantity of the electronic components inside the mobile electronic device is increased. Therefore, the lock position for the latching structure of the mobile electronic device is quite limited. In addition, some mobile electronic devices adopt a sliding switch to lock and release the display on the base of the mobile electronic device. However, to operate the sliding switch has to be conducted with the friction force between the user's finger and the sliding switch. Generally speaking, these kinds of sliding switches used in the mobile electronic devices are inconvenient to open the display from the base of the mobile electronic device for users.

SUMMARY OF THE INVENTION

One objective of the present invention is to provide a latching structure of a mobile electronic device to conveniently release the display from the base of the mobile electronic device with a button.

Another objective of the present invention is to provide a latching structure of a mobile electronic device to connect the button module and the hook module thereof with a linking rod so as to effectively extend the lock position of the latching structure on the mobile electronic device.

To achieve these and other advantages and in accordance with the objective of the present invention, as the embodiment broadly describes herein, the present invention provides a latching structure of a mobile electronic device. The latching structure of the mobile electronic device includes a lock pin, a button module, at least one linking rod, and at least one hook module respectively disposed on a display and a base of the mobile electronic device. In one embodiment, the lock pin is installed on the display of the mobile electronic device, and the button module, the linking rod and the hook module are installed in the base of the mobile electronic device. One end of the linking rod is coupled to the button module, and another end of the linking rod is coupled to the hook module. Therefore, when the button is pressed, the button module drives the linking rod so that the hook module releases the lock pin to allow a user opening the display of the mobile electronic device.

In one embodiment, the latching structure of the mobile electronic device includes two linking rods and two hook modules corresponding to the quantity of the linking rods, and the linking rods are installed on two sides of the button module to couple to corresponding hook modules. In one embodiment, the moving direction of the button module is perpendicular to the surface, where the button module is disposed, of the mobile electronic device, and the moving directions of the linking rods and the moving direction of the button module are formed in a predetermined angle, and preferably a right angle. In one embodiment, one of the hook modules clockwise releases a corresponding lock pin and another one of the hook modules anticlockwise releases another corresponding lock pin. Therefore, the display can stably lock on the base of the mobile electronic device.

The button module can further include a button module base, a button and two sliding pieces, and the button and the sliding pieces are slidable on the button module base to force the linking rods to move toward the button module. The button module further comprises a first elastic member to reposition the button. The button and the button module base further include short posts to couple to the first elastic member to form a spacing limitation for the button. The button module further includes a second elastic member to reposition the sliding piece.

The hook module further includes a hook base having an opening, an eject cover coupled to the opening of the hook base, and a fourth elastic member coupled between the eject cover and the hook base to push the lock pin upward.

The hook base further includes a fixing arm to fix the hook module on the mobile electronic device. The hook module further includes an extension arm extending from the hook base, and a rotatable hook having a protrusion portion, a rotational portion and a coupling portion. The rotational portion is coupled to the extension arm to rotatable on the hook base. The protrusion portion is utilized to lock the lock pin, and the coupling portion is coupled to the linking rod.

The hook module further includes an E-ring and a pin to couple the rotatable hook on the extension arm. The hook module further includes a third elastic member to reposition the rotatable hook. The linking rod further includes a first tail hook coupled to the button module and a second tail hook coupled to the hook module.

Accordingly, the latching structure of the mobile electronic device according to the present invention can conveniently open the display from the base of the mobile electronic device with the button. In addition, with the linking rods, the position of the rotatable hooks can be effectively extended. Furthermore, the cross-section of the linking rod is very small so that the latching structure can be easily disposed inside the mobile electronic device anywhere without interference on the internal elements installed in the mobile electronic device.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
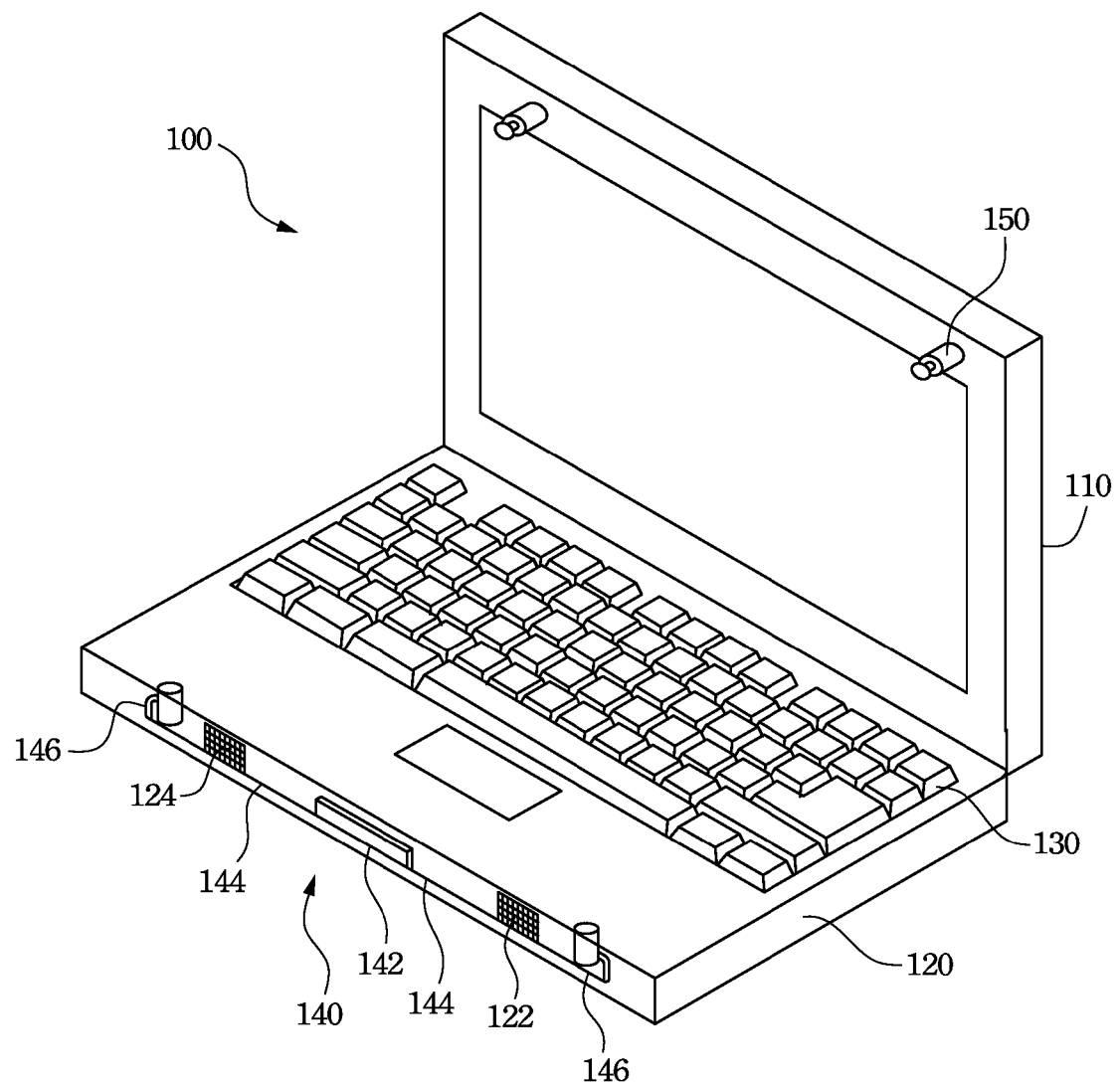
FIG. 1 illustrates a preferred embodiment of a latching structure of a mobile electronic device according to the present invention.

Refer to FIG. 1. FIG. 1A illustrates a preferred embodiment of a latching structure of a mobile electronic device according to the present invention. The latching structure 140 is equipped in a mobile electronic device 100 to lock a first shell and a second shell of the mobile electronic device 100. The latching structure 140 is configured in the first shell while the lock pin is configured in the second shell. The first shell and the second shell are, for example, a display 110 and a base 120 respectively. In this embodiment, the latching structure 140 is configured in the base 120 while the lock pin 150 is configured in the display 110. The base 120 of the mobile electronic device 100 further includes a keyboard 130 and a pair of speakers, e.g. a right speaker 122 and a left speaker 124.

The latching structure 140 of the mobile electronic device includes a button module 142, a linking rod 144 and a hook module 146. The display 110 includes lock pins 150 thereon to couple to the hook module 146. Therefore, the display 110 can be stably locked on the base 120 of the mobile electronic device 100 when the mobile electronic device 100 is carried by a user. In another embodiment, the latching structure 140 can be configured in the display 110 and the lock pin 150 can be configured in the base 120 without departing from the spirit and scope of the present invention.

The cross-section of the linking rod 144 is very small and the linking rod 144 is formed by a metal wire or a sheet metal. Because the linking rod 144 has a small cross-section, the linking rod 144 can easily pass through the right speaker 122 and/or the left speaker 124 without influence on the installation of the right speaker 122 and/or the left speaker 124. The linking rod 144 is preferably made of a metal wire with a diameter lower than about 3 millimeter (mm), and more preferably lower than about 2 mm.

Figure 2:
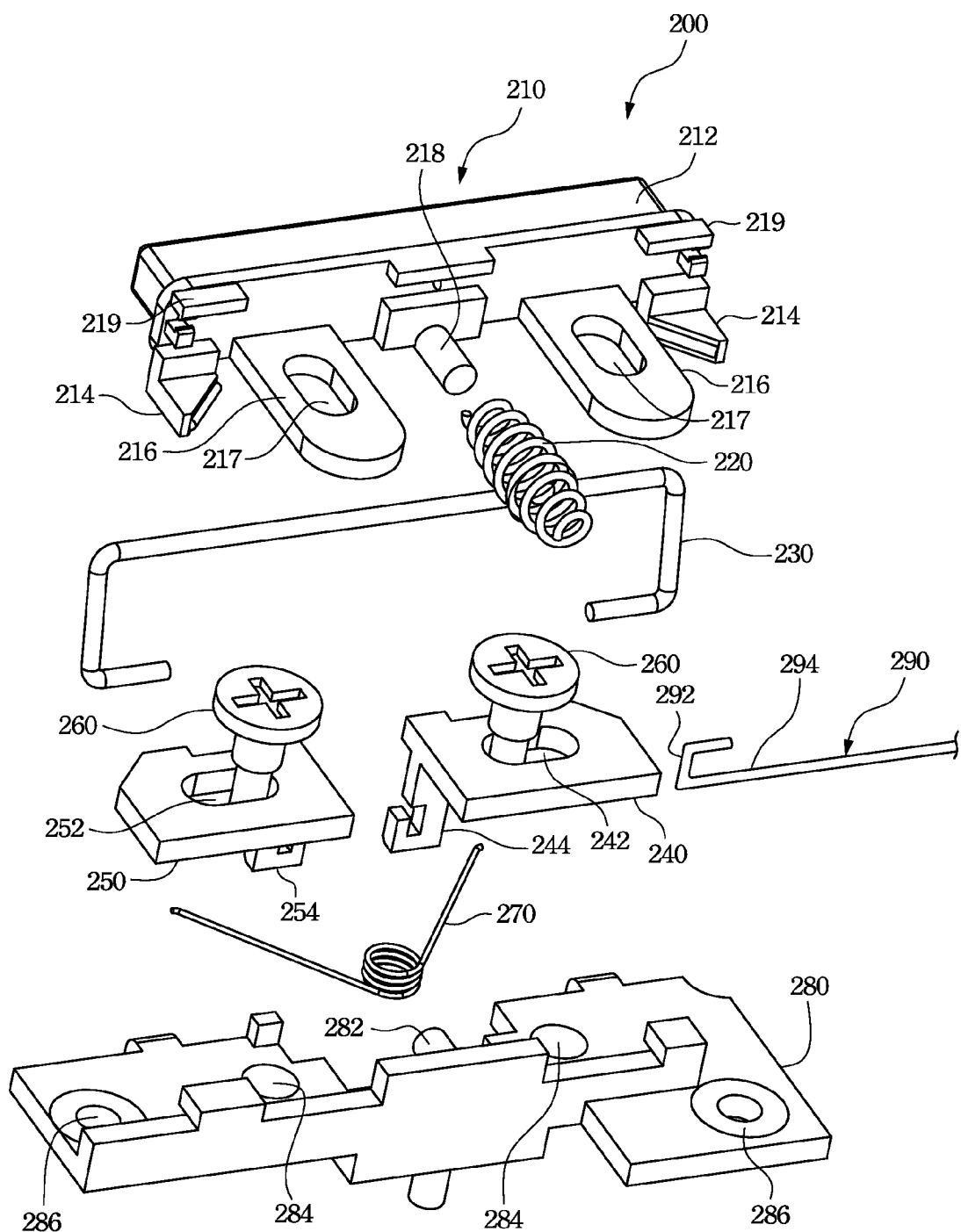
FIG. 2 illustrates an exploded view of the button module of the preferred embodiment of the latching structure according to the present invention.

Refer to FIG. 2. An exploded view of the button module of the preferred embodiment of the latching structure according to the present invention is illustrated. The button module 200 includes a button 210, a button module base 280, a second sliding piece 240 and a third sliding piece 250. The second sliding piece 240 and the third sliding piece 250 are slidably connected to the button module base 280 with screws 260. In addition, the button 210 can also be slidably connected to the button module base 280 with screws 260. A moving direction of the button 210 and a moving direction of the second sliding piece 240 are preferably formed at a predetermined angle, such as a right angle. Furthermore, the moving direction of the button 210 and a moving direction of the third sliding piece 250 are also preferably formed at a predetermined angle, such as a right angle.

In one preferred embodiment, the button 210 includes a button body 212, a pushing block 214 and at least one first sliding piece 216. The first sliding piece 216 includes a sliding slot 217. The screw 260 passes through the sliding slot 217 and is fixed in the openings 284 on the button module base 280. Therefore, the button 210 can slide relative to the screws 260 along the sliding slot 217. The pushing block 214 includes inclined planes to couple to inclined planes of the second sliding piece 240 and the third sliding piece 250 so as to able to be moved at the predetermined angle, preferably the right angle. The screws 260 also pass through a sliding slot 242 of the second sliding piece 240 and a sliding slot 252 of the third sliding piece 250, and are then fixed on the openings 284 of the button module base 280. Therefore, the second sliding piece 240 and the third sliding piece 250 can slide relative to the screws 260 along the sliding slot 242 and the sliding slot 252.

The moving direction of the second sliding piece 240 and the moving direction of the third sliding piece 250 are preferably disposed at 180 degrees. That is to say, the second sliding piece 240 is moved to the left side on the drawing while the third sliding piece 250 is moved to the right side on the drawing. At the moment, a second clamp 244 of the second sliding piece 240 is coupled to a first tail hook 292 of the linking rod 290 to move the linking rod 290 to move to the left side. Similarly, the third sliding piece 250 can move another linking rod (not shown) coupled to a third clamp 254 of the third sliding piece 250 to the right side. In one preferred embodiment, the linking rod 290 is moved toward the button module 200 to drive the corresponding hook module. Alternatively, the linking rod 290 can also be moved far away from the button module 200 without departing from the spirit and scope of the present invention.

The button body 212 further includes a short post 218 corresponding to a short post 282 on the button module base 280 to install a first elastic member 220 therebetween to reposition the button 210. In addition, the short post 218 and the short post 282 can further provide a spacing limitation to halt the button 210 when the short post 218 gets in touch with the short post 282.

The button module 200 further includes a balance bar 230 rotatable coupled to first clamps 219 disposed on the rear side of the button 210. Two ends of the balance bar 230 get in touch with the button module base 280 to balance the right force and the left force for the button 210 when the button 210 is pressed. Therefore, the displacements of the second sliding piece 240 and the third sliding piece 250 are equal and the displacements of the linking rods 290 are equal too.

The button module 200 further includes a second elastic member 270, and two ends of the second elastic member 270 respectively couple to the second sliding piece 240 and the third sliding piece 250. When the button 210 is released, the second elastic member 270 provides a force to reposition the second sliding piece 240 and the third sliding piece 250.

Figure 3:
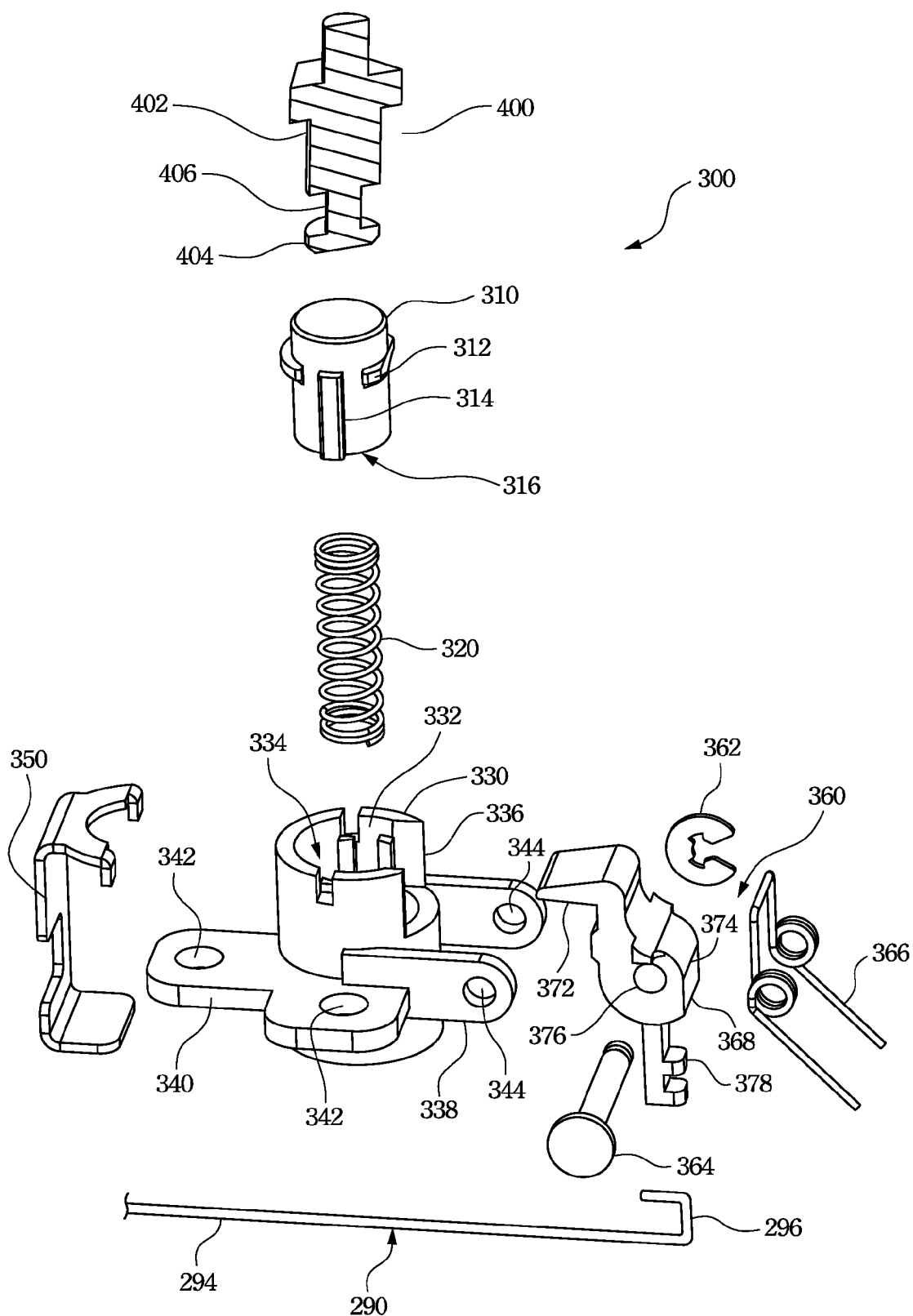
FIG. 3 illustrates an exploded view of the hook module of the preferred embodiment of the latching structure according to the present invention.

When the second sliding piece 240 is moved to the left side of the drawing, the third sliding piece 250 is moved to the right side of the drawing. At the moment, the linking rods 290 are moved to corresponding directions to rotate the hook modules disposed on two sides of the mobile electronic device. Further refer to FIG. 3. An exploded view of the hook module of the preferred embodiment of the latching structure according to the present invention is illustrated. The linking rod 290 further includes a connecting bar 294 and a first tail hook 262 and a second tail hook 296. The second tail hook 296 is coupled to the hook module 300. When the linking rod 290 drives the hook module 300, a rotatable hook 360 of the hook module 300 releases the lock pin 400 on the display to allow the user opening the display from the base.

The hook module 300 includes a hook base 330 and a rotatable hook 360 rotatable coupling to the hook base 330.

When the rotatable hook 360 of the hook module 300 is pulled by the second tail hook 296 of the linking rod 290 pull, the rotatable hook 360 can release the lock pin 400 to allow the display being opened from the base of the mobile electronic device.

The hook module 300 may further include an eject cover 310 and a fourth elastic member 320 to push the lock pin 400 upwardly when the lock pin 400 is released by the rotatable hook 360. Therefore, the user can conveniently open the display from the base.

The eject cover 310 may further include at least one sliding protrusion 314 coupled to at least one sliding slot 332 inside a protection wall 336 of the hook base 330 to prevent the eject cover 310 from rotating when moving upward and downward. The eject cover 310 can further include at least one arresting flange 312 to prevent the eject cover 310 escaping from the hook base 330 and to ensure the eject cover 310 moving inside the protection wall 336. The hook base 330 preferably includes an eject cover bracket 350 to lock the hook base 330 and prevent the eject cover 310 escaping from the hook base 330. The eject cover 310 preferably includes an opening 316 to couple to the fourth elastic member 320 so as to stably push the lock pin 400 upward when the rotatable hook 360 releases the lock pin 400. The hook base 330 preferably includes an opening 334 to hold the fourth elastic member 320 and the eject cover 310.

The hook base 330 may further include at least one extension arm 338 and a fixing arm 340. The extension arm 338 includes an opening 344 to couple to the through hole 376 of the rotatable hook 360 with E-ring 362 and pin 364. Therefore, the rotatable hook 360 can rotate on the extension arm 338. The rotatable hook 360 preferably includes a hook main body 368 having a protrusion portion 372, a rotational portion 374 and a coupling portion 378. The through hole 376 is disposed at the rotational portion 374, the protrusion portion 372 for locking the eject cover 310 is connected to the rotational portion 374. In addition, the coupling portion 378 is also connected to the rotational portion 374, and coupled to the second tail hook 296 of the linking rod 290. When the button module 200 (shown in FIG. 2) moves the linking rod 290, the second tail hook 296 can pull the coupling portion 378 of the rotatable hook 360 so that the protrusion portion 372 releases the lock pin 400, that is, the protrusion portion 372 releases the lock trough 406 of the lock pin 400 which is formed between the lock pin main body 402 and the lock flange 404.

The fixing arm 340 further includes an opening 342 for fixing the hook base 330 on the base of the mobile electronic device. The rotatable hook 360 can further include a third elastic member 366 to reposition the rotatable hook 360 to lock the lock pin 400 when the display of the mobile electronic device is locked on the base thereof.

Hence, the latching structure of the mobile electronic device according to the present invention can conveniently lock the display on the base of the mobile electronic device. The linking rod can effectively extend the installation position of the rotatable hook. When a user vertically pushes the button module on the display or the base of the mobile electronic device, the display can be easily opened by the user. In addition, the rotatable hooks are moved to the directions perpendicular to the moving direction of the button, and the moving directions of the rotatable hooks are opposite to each other, for example, one is clockwise and another one is anti-clockwise. Therefore, the display can stably lock on the base. In addition, due to a small cross-section of the linking rod, the latching structure can be disposed inside the mobile electronic device and very close to the internal elements of the mobile electronic device without interference. For example, the linking rod can be disposed under the speakers without any influence on the configuration of the speakers (shown in FIG. 1). Therefore, the configuration of electronic components inside the mobile electronic device is easier.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A latching structure of a mobile electronic device, comprising:
   a button module installed on a first shell of a mobile electronic device, the button module further comprising a button module base, a button and at least one sliding piece, wherein the button and the sliding piece are slidable on the button module base and the button further comprises a pushing block;
   at least one linking rod, one end of the linking rod connected to the sliding piece; and
   at least one hook module coupled to another end of the linking rod, wherein the pushing block pushes the sliding piece to drive the linking rod so that the hook module releases a lock pin installed on a second shell of the mobile electronic device when the button is pressed, wherein the hook module further comprises:
   a hook base having an opening ;
   an eject cover coupled to the opening of the hook base;
   an eject cover elastic member coupled between the eject cover and the hook base to push the lock pin upward when the button is operated to unlatch the hook module and the hook module is not engaged to the lock pin,
   an extension arm extending from the hook base; and
   a rotatable hook comprising a protrusion portion, a rotational portion and a coupling portion, the coupling portion coupling to the extension arm to rotatable on the hook base, wherein the protrusion portion is utilized to lock the lock pin, and the coupling portion is coupled to the linking rod.

2. The latching structure of the mobile electronic device of claim 1, wherein the first shell is a base of the mobile electronic device and the second shell is a display of the mobile electronic device.

3. The latching structure of the mobile electronic device of claim 1, wherein the first shell is a display of the mobile electronic device and the second shell is a base of the mobile electronic device.

4. The latching structure of the mobile electronic device of claim 1, wherein a quantity of the at least one linking rod is two, a quantity of the at least one hook module is corresponding to the quantity of the at least one linking rod, and the two linking rods are installed on two sides of the button module to couple to one corresponding hook module of the two hook modules.

5. The latching structure of the mobile electronic device of claim 4, wherein a moving direction of the button module is perpendicular to a surface of the mobile electronic device, and moving directions of the two linking rods and the moving direction of the button module are formed a predetermined angle.

6. The latching structure of the mobile electronic device of claim 5, wherein the predetermined angle is a right angle.

7. The latching structure of the mobile electronic device of claim 6, wherein one of the two hook modules clockwise releases a corresponding lock pin and another one of the two hook modules anticlockwise releases another corresponding lock pin.

8. The latching structure of the mobile electronic device of claim 1, wherein the button module further comprises a button elastic member to reposition the button.

9. The latching structure of the mobile electronic device of claim 8, wherein each of the button and the button module base further comprises a short post to couple to the button elastic member to form a spacing limitation for the button.

10. The latching structure of the mobile electronic device of claim 1, wherein the button module further comprises a sliding piece elastic member to reposition the sliding piece.

11. The latching structure of the mobile electronic device of claim 1, wherein the hook base further comprises a fixing arm to fix the hook module on the mobile electronic device.

12. The latching structure of the mobile electronic device of claim 1, wherein the hook module further comprises:
an E-ring; and
a pin to couple the rotatable hook on the extension arm.

13. The latching structure of the mobile electronic device of claim 12, wherein the hook module further comprises a rotatable hook elastic member to reposition the rotatable hook.

14. The latching structure of the mobile electronic device of claim 1, wherein the linking rod further comprises a first tail hook coupled to the button module and a second tail hook coupled to the hook module.

* * * * *